United States Patent

Brown et al.

[15] 3,650,406
[45] Mar. 21, 1972

[54] OIL COLLECTION RETRIEVAL SYSTEM

[72] Inventors: Louis Stanislaus Brown; Frank Adams March, both of Reston; Richard Patten Bishop, Vienna; Bruce Calvin Gilman, Annandale, all of Va.

[73] Assignee: Ocean Systems, Inc., New York, N.Y.

[22] Filed: Oct. 12, 1970

[21] Appl. No.: 80,044

[52] U.S. Cl. ............................210/242, 210/DIG. 21
[51] Int. Cl. ...........................................C02b 9/02
[58] Field of Search............210/83, 242, 523, DIG. 21; 61/1 F

[56] References Cited

UNITED STATES PATENTS

| | | | |
|---|---|---|---|
| 3,476,246 | 11/1969 | Dahan | 210/83 |
| 3,548,599 | 12/1970 | Reilly | 61/1 F |
| 3,499,290 | 3/1970 | Smith | 61/1 F |
| 3,184,923 | 5/1965 | Galvaing | 210/DIG. 21 |
| 3,146,598 | 9/1964 | Smith | 210/DIG. 21 |
| 3,565,254 | 2/1971 | Latimer | 210/242 X |

Primary Examiner—Reuben Friedman
Assistant Examiner—T. A. Granger
Attorney—Paul A. Rose, Harrie M. Humphreys, Dominic J. Terminello and Eugene Lieberstein

[57] ABSTRACT

A system for collecting and retrieving a liquid of low density from the surface of a body of liquid of higher density which includes a catch basin having a floating weir as one section thereof through which the lower density liquid flows, and means for retrieving the liquid from the interior of the basin. The floating weir consists of a buoyant upper section and a water absorbent lower section representing the ballast for the upper section.

9 Claims, 2 Drawing Figures

PATENTED MAR 21 1972　　　　　　　　　　　　3,650,406

INVENTORS
LOUIS S. BROWN
FRANK A. MARCH
RICHARD P. BISHOP
BY BRUCE C. GILMAN
ATTORNEY

OIL COLLECTION RETRIEVAL SYSTEM

This invention relates to an antipollution system for the collection and retrieval of a liquid of low density, such as oil, from the surface of a body of liquid of higher density such as water.

Spilled oil is difficult to remove from the sea because it not only spreads rapidly but undergoes changes with time due to evaporation and emulsification rendering the oil as time passes more dense and therefore more difficult to collect. The weathering of the oil is related to the condition of the surrounding sea, temperature and oil type. Hence, recovery of oil from an oil spill, to be effective, must be rapid. The system employed for such purpose must also be ecologically acceptable.

The system of the present invention provides rapid selective collection and retrieval of oil and includes in combination: a catch basin comprising; a floating boom consisting of a plurality of serially connected liquid confining barrier modules, a floating weir coupled to said floating boom which comprises a buoyant substantially water impervious upper section and a water-absorbing lower section representing, once submerged, the sole ballast for said upper section, a flexible support member connected to said boom and to said weir to form a bottom for said basin into which the liquid is to be collected; and means for retrieving said liquid from said basin.

Figures 1, 2:
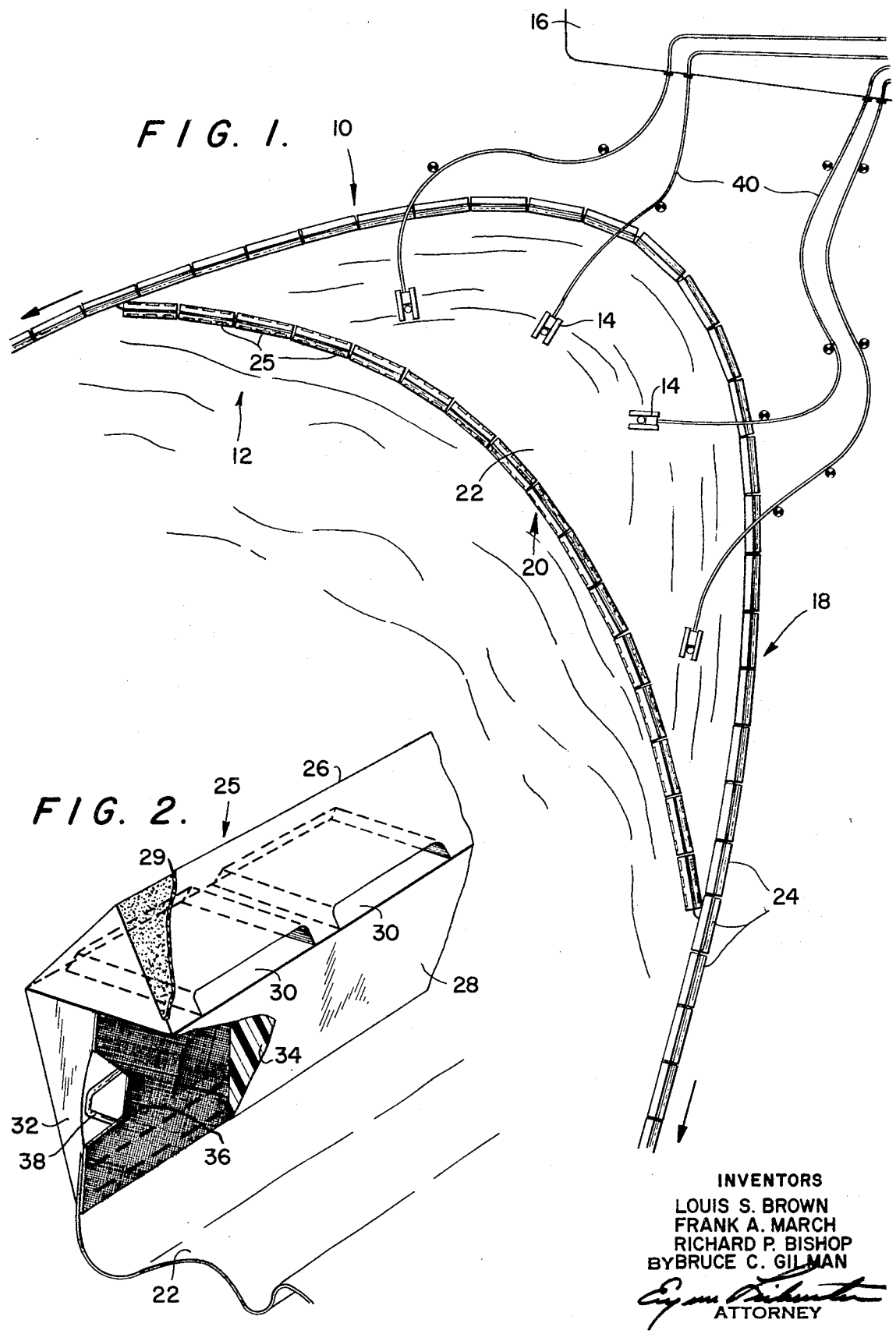
FIG. 1 is a diagrammatic showing of the system of the present invention.
FIG. 2 is a perspective view of one of the modules of the floating weir of FIG. 1 shown connected to the basin bottom with part of the lower section of the module removed to illustrate the preferred construction thereof.

The system as shown in FIG. 1 is composed of a catch basin 10 which is adapted to be towed in the direction of the oil slick 12 by two tow vessels (not shown). A number of pumps 14 are located in the interior of the basin 10 to deliver oil accumulated in the basin 10 to an oil receiving vessel 16. The catch basin 10 is made up of a floating oil boom 18, a floating weir 20 and a reinforced support bottom 22.

The floating oil boom 18 is defined by a plurality of serially connected liquid confining barrier modules 24. Although any conventional type barrier may be used it is highly preferred that the barrier be constructed as taught in U.S. patent application Ser. No. 079,997, commonly assigned and filed concurrently herewith and entitled "System and Barrier for Containing an Oil Spill." The barrier as shown and taught in the above-identified application comprises a plurality of serially connected modules each defined as a composite structure having a buoyant substantially water impervious upper section and a water absorbing lower section which represents once immersed the sole ballast for said upper section and concomitantly the subsurface barrier for the module. The upper and lower sections of each module are fabricated from polyurethane foam. The lower section is divided into two sections with a thin beltlike member vertically aligned between the segments and extending longitudinally for substantially the entire length of the module. The shape and construction of each barrier module 24 would thus be similar to the construction of the floating weir 20 as explained below in connection with FIG. 2.

The floating weir 20 consists of a plurality of serially coupled modules 25 where each module 25 comprises an upper section 26 which is bonded to a lower section 28 by means of any conventional water repellent adhesive preferably an elastomer or epoxy resin. The upper section 26 provides the buoyancy for the module 25 and through apertures 30, 30 controls the oil flow into the basin 10 while the lower section 28 extends below the surface of the sea and functions concurrently as ballast for the upper section 26 and as the subsurface barrier of the module 25.

Both the upper and lower sections 26 and 28, respectively, are fabricated from a flexible polyurethane foam material with the upper section 26 preferably of a polyether based polyurethane foam and the lower section 28 of a reticulated polyester based polyurethane foam. Other materials such as porous rubber and sponge having low density may also be used. To maintain a state of buoyancy the upper section 26 is rendered water repellent by coating the surface with a sealant 29 such as an elastomer or an epoxy resin. The bonding water repellent adhesive between the upper and lower sections (not shown) prevents water seepage from the lower section into the upper section. Apertures 30, 30, located in the upper section 26 of each module 25 control the flow of liquid from one side of the module to the opposite side thereof and into the interior of the basin 10 as will be explained hereafter.

The lower section 28 of module 25 is divided into two segments 32 and 34, respectively. A thin belt-like member 36 is vertically interposed between the two segments and extends longitudinally along substantially the entire length of the module 25. The belt 36 is bonded in such position against the two segments 32 and 34 by means of a sealing adhesive (not shown) such as, for example, an epoxy resin or an elastomer. The sealing adhesive not only cements the two segments 32 and 34 against the belt 36 and to each other but represents in combination with belt 36 a partition for preventing any oil from passing between the segments 32 and 34, respectively. The belt 36 is preferably composed of a fabric material such as dacron to provide structural rigidity and limited elasticity. A conventional coupling element 38 is attached to each longitudinal end of the belt 36 for coupling the modules 25 to each other in abutting relationship to seal the joined ends. The joined ends may be otherwise sealed in any conventional manner.

The trapped sea water in the lower section 28 provides the stability for each module resulting in excellent sea conformance characteristics for the weir 20. For compatibility and to optimize overall performance it is preferred that the floating boom 18 be constructed in a manner similar to that described for the weir 20 as taught in the aforementioned concurrently filed patent application.

The cross sectional geometry of each module 25 is preferably that of a non-symmetric rhombus composed of two equilateral triangles having a common base with the bottom triangle having approximately twice the height of the upper triangle.

The basin 10 is completed by connecting the bottom support member 22 to both the weir 20 and floating boom 18. The preferred method of attachment is to sew the bottom support member 22 to the belt 36 as shown in FIG. 2 at the interface between the mated segments 32 and 34. An alternative approach might be merely to cement the bottom member 22 in place between segments 32 and 34, respectively, of lower section 28. Attachment to the floating boom 18 will depend upon the chosen construction for the boom 18. Where the boom 18 is constructed in the manner as taught in the aforementioned patent application, i.e., as shown in FIG. 2 except for passages 30, 30, attachment may be made by sewing the bottom support 22 to the belt as described above with reference to the weir 20.

The preferred material for the bottom support member 22 is a nylon-reinforced rubber sheeting which is flexible and has high tensile strength. The material should also be unaffected by sunlight, sea water and aromatic hydrocarbons.

In operation, two tow boats will be connected, in the vicinity of the oil spill, to the opposite ends of the floating boom 18 for movement in the direction of the oil spill 12 as indicated by the arrows in FIG. 1. The boom 18 and weir 20 will assume a parabolic contour in response to water currents and/or tow movement. Oil is trapped by the boom 18 and is funneled toward the weir 20 where part of the piled up oil will pass through passages 30, 30 into the interior of the catch basin 10 from which it may be simultaneously removed by pumping means 14 through discharge lines 40 and into the receiving vessel 16. A grating (not shown) may be placed in front of each mouth 30 of weir 20 to prevent flotsam from clogging the opening.

The water saturated lower section 28 of each module 25 of weir 20 tends to keep the openings 30, 30 at the same position relative to the oil-water interface. Thus, a high proportion of oil to water flows into the catch basin 10.

What is claimed is:

1. In a system, adapted to be towed along the surface of a body of liquid such as water, for collecting and retrieving from said body of liquid a substantially floating deposit of a lower density liquid such as oil, the improvement of which includes in combination: a catch basin comprising:
   a. a floating boom consisting of a plurality of serially connected liquid confining barrier modules;
   b. a floating weir coupled to said floating boom at two intermediate points thereof, which comprises a barrier having a buoyant substantially liquid impervious upper section with at least one liquid passageway extending therethrough and a liquid absorbing lower section representing, once submerged, the primary ballast for said upper section, said floating weir and the portion of said floating boom connected thereto forming the periphery of the basin; and
   c. a flexible support member connected about said periphery to form a bottom for the basin into which the lower density liquid is to be collected; and means for retrieving the collected liquid from said basin.

2. A system as defined in claim 1 wherein said floating weir consists of a plurality of floating modules serially connected to each other with the upper and lower sections of each module formed from at least one material selected from the class consisting of flexible foam, porous rubber, and sponge having low density.

3. A system as defined in claim 2 wherein each upper section is a polyether based polyurethane foam and wherein said lower section is a reticulated polyester based polyurethane foam.

4. A system as defined in claim 3 wherein the upper section of each module has an elastomer surface outer coating and wherein the low section of each module is composed of two symmetrical segments and a relatively thin belt-like member located in a vertical plane between said segments and extending longitudinally for substantially the entire length of the module.

5. A system as defined in claim 4 wherein each module of said floating boom consists of a buoyant substantially water impervious upper section and a water absorbent lower section representing once submerged the sole ballast for said upper section and the subsurface liquid barrier for the module.

6. A system as defined in claim 5 wherein said upper and lower sections are formed from a flexible foam plastic composed of polyurethane.

7. A system as defined in claim 6 wherein said lower section is composed of two segments and a relatively thin belt-like member vertically aligned between said segments and extending longitudinally along substantially the entire length of the module.

8. A system as defined in claim 7 wherein the flexible bottom support member of said basin is joined at the interface between the segments of the lower section of the weir and to the submerged underbottom of the boom.

9. A system as defined in claim 8 wherein the flexible bottom support member is composed of a nylon reinforced rubber sheeting.

* * * * *